United States Patent [19]
Carlton et al.

[11] Patent Number: 5,218,285
[45] Date of Patent: Jun. 8, 1993

[54] ELECTRONIC DEVICE WITH DUAL PURPOSE REGULATOR

[75] Inventors: Stephen G. Carlton, Plantation; Lorenzo Cruger, Jr., Sunrise, both of Fla.

[73] Assignee: Motorola, Inc., Schaumburg, Ill.

[21] Appl. No.: 807,919

[22] Filed: Dec. 16, 1991

[51] Int. Cl.[5] .................................. H02J 7/14
[52] U.S. Cl. ............................. 320/15; 320/6
[58] Field of Search ............ 320/5, 6, 8, 14, 15, 320/21; 455/89, 90

[56] References Cited

U.S. PATENT DOCUMENTS

| | | | |
|---|---|---|---|
| 3,555,395 | 1/1971 | Beery | 320/15 X |
| 4,044,293 | 8/1977 | Follmer | 320/15 |
| 4,237,410 | 12/1980 | Erickson et al. | 320/14 |
| 4,401,935 | 8/1983 | Yerkes | 320/14 X |
| 4,516,066 | 5/1985 | Nowakoswki | 320/15 |
| 4,694,237 | 9/1987 | Hanson | 320/6 |
| 4,963,813 | 10/1990 | Bolle | 320/6 X |

FOREIGN PATENT DOCUMENTS 0838900 6/1981 U.S.S.R. .................................. 320/5

*Primary Examiner*—Steven L. Stephan
*Assistant Examiner*—Kristine Peckman
*Attorney, Agent, or Firm*—M. Mansour Ghomeshi

[57] ABSTRACT

An electronic device (100) having a battery (116) with an associated battery voltage. The battery (116) includes a plurality of cells configured to form a plurality of battery portions (116A and 116B). The electronic device (100) also includes a regulator (102), a first circuit (118), and a swith control circuit (106). The regulator (102) operates on the battery voltage and produces a regulated voltage. The first circuit (118) operated on the battery voltage. The switch control circuit (106) alternately applies the regulated voltage to the plurality of battery portions (116A and 116B) so as to charge the battery (116).

12 Claims, 1 Drawing Sheet

ELECTRONIC DEVICE WITH DUAL PURPOSE REGULATOR

TECHNICAL FIELD

This invention relates in general to communication devices and most specifically to battery operated communication devices.

BACKGROUND OF THE INVENTION

Battery operated communication devices are generally equipped with a regulator to regulate the battery voltage down to appropriate levels for active components to operate. In high power devices, on the other hand, the battery voltage is directly applied to the high power amplifier in order to minimize power losses and meet the high power requirements of such power amplifiers. Charging of the battery is generally accomplished via an external charger. This charger includes a regulator which regulates an AC voltage down to a level adequate to charge the batteries. A problem with this charging scheme is that the external charger is an inconvenience because it must be carried along with the communication device. Incorporation of the charger circuit in the communication device is, therefore, highly desirable. However, this incorporation introduces several problems. One such problem is with the use of a second regulator which is needed to charge the battery. Heat sinking of this second regulator requires a significant area which when combined with the area needed for the heat sink that is required for the internal regulator will pose a significant space problem. A need is therefore felt for a battery operated communication device which includes charging circuits without the additional charging regulator.

SUMMARY OF THE INVENTION

Briefly, according to the invention, an electronic device is provided having a first circuit which operates on a first voltage. The electronic device also includes a second circuit which operates on a second voltage which is lower than first voltage. Also included in the electronic device is a battery for producing the first voltage. A regulator operating selectively on the first voltage and producing a second voltage along with a means for charging the battery using the regulator are also provided in the electronic device.

DETAILED DESCRIPTION OF THE PREFERRED EMBODIMENT

Figure 1:
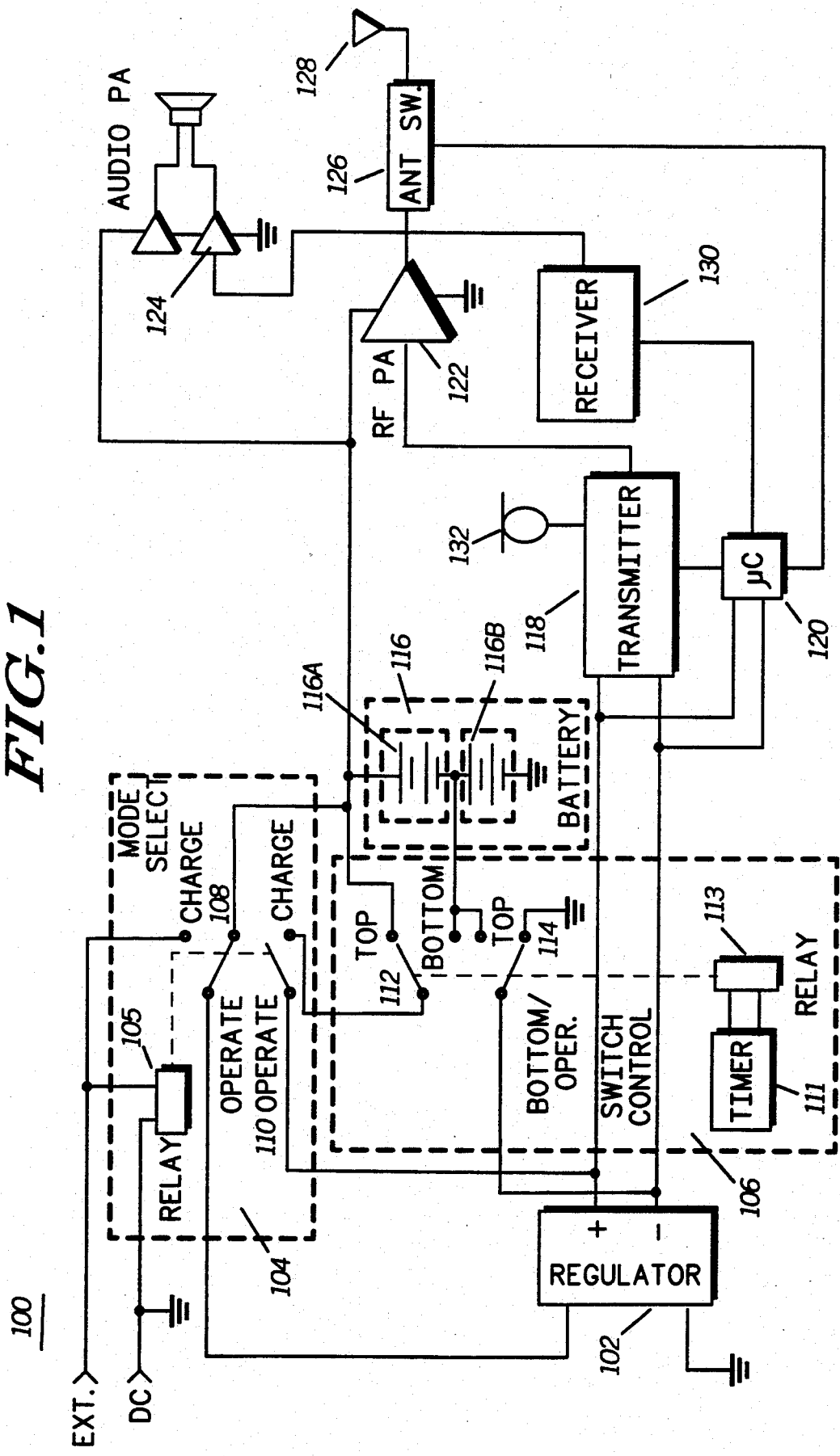
FIG. 1 shows a block diagram of a communication device in accordance with the principles of the present invention.

Electronic devices operating on battery are generally charged via external chargers. This is generally true due to the additional space that is required for the charging components including bulky heat sinks and charging regulators. Most communication devices employ a regulator to regulate voltages produced by the battery, to levels suitable for the internal elements to operate. In accordance with the invention, an apparatus is included in the communication device that allows the use of a single regulator for both charging the batteries and providing regulated voltage for proper device operation.

Referring to FIG. 1, a block diagram of a communication device 100 in accordance with the principles of the present invention is shown. The device 100 includes a power supply portion and a radio portion. At the heart of the power supply portion, resides a battery 116 which includes a plurality of cells divided into a plurality of portions. In the preferred embodiment, the battery 116 includes ten cells divided into two portions, 116A and 116B, having equal number of cells. A regulator 102 is used in conjunction with a switch control circuit 106 to charge the battery when charging is desired. Included in the switch control circuit is a timer 111 and a relay 113. The timer is used to periodically energize the relay 113 in order to allow the switch control circuit to flip between two different positions. The charging of the battery is accomplished by alternately coupling the regulated voltage of the regulator 102 to the first portion 116A and the second portion 116B, using the switch control circuit 106. In other words, the regulator voltage is applied to the first portion 116A and then to the second portion 116B at a desired alternating rate. The switching rate of the switch control circuit 106 must be high enough to ascertain that equal charge is applied to the two portions 116A and 116B in order to avoid damage to the battery. In the preferred embodiment, this rate is set at 1 Khz. Rates above 50 Hz and below 5 Khz are well suitable for this application. Along with charging the battery 116, the regulator 102 is used to provide regulated voltage to the active components of the communication 100. In this embodiment, a microcomputer 120 is used to control the operation of the communication device 100. A receiver 130 and a transmitter 118 are used to provide the receiver and transmitter functions, respectively. Audio signals are coupled to the transmitter 118, via a microphone 132, where they modulate a carrier signal. The modulated carrier signal is then applied to a radio frequency power amplifier 122 for high power amplification. The output of the amplifier 122 is coupled to an antenna 128 via an antenna switch 126. Supply voltage for the power amplifier 122 is directly provided by the battery 116. This direct coupling of the battery voltage is necessary because of the high power requirements of the power amplifier 122. The regulator voltage is insufficient to power up the amplifier 122. Furthermore, the significant energy loss renders such a power distribution inefficient.

Radio frequency signals received at the antenna 128 are coupled to the receiver 130 via the antenna switch 126. Signals received at the receiver 130 are demodulated and the resulting audio portions are applied to an audio power amplifier 124 for amplification. The audio power amplifier 124 provides the amplified audio signals to a speaker 134. Once again, the supply voltage for the power amplifier 124 is provided directly by the battery 116. It is known that the maximum efficiency and output power may be achieved by directly coupling the battery 116 to the amplifiers 122 and 124.

In the preferred embodiment, the communication device 100 includes two modes of operation-an operating mode and a charging mode. A mode selector 104 is used to dictate the mode of operation of the communication device 100. In the preferred embodiment, the mode selector 104 comprises a relay 105 preferably controlled by an external signal. This external signal is preferably the charging signal which is used to charge the battery 116. Switches 108 and 110 are used to switch between the operate mode and the charge mode. In the operate mode, the first switch 108 is in the bottom position while the switch 110 is in the open position. The switch 108 couples the battery voltage to the input of the regulator 102 while the switch 110 disconnects the output of the regulator 102 from the battery 116. In this mode of operation, the battery voltage is regulated by the regulator 102 and applied to the transmitter 118 receiver 130, microcomputer 120 and other elements of the device 100. The switch control circuitry 106 is inactive because of the disconnection provided by the switch 110. On the other hand, switch 108 flips to the charge position and the switch 110 closes, when charging of the battery 116 is desired. The charge position of the switch 108 provides the coupling of an external DC or AC voltage to the regulator 102. The regulator 102 regulates the external voltage and couples it to the switch control 106 via the switch 110. The switch control circuit 106 includes switches 111 and 114 that switch between the top of the first portion 116A and the second portion 116B, periodically. In the top position, the switch 112 provides the positive rail of the output voltage of the regulator 102 to the positive terminal of the first potion 116A. When the top portion of the battery 116A is being charged, the switch 114 is in the top position as well allowing the negative terminal of the regulator 102 to be coupled to the negative terminal of the top portion 116A. When the bottom portion is being charged, switches 112 and 114 flip to the bottom side and apply the output of the regulator 102 to the bottom portion of the battery 116B. Switching between the top and the bottom portion occurs at high frequency in order to result in full charge of the battery 116, with no battery damage. A timer 111 is used to provide a switching signal for the relay 113. The frequency of operation of the timer may be controlled via discrete components or via the micro-computer 120. Indeed, the operation of the timer 111 may be entirely implemented in the microcomputer 120.

It can be seen that by employing this switch control circuit 106 and the mode select 104, the same regulator 102 can be used to both provide power to the elements of the communication device 100 and to charge the battery 116. By dividing the cells of the battery 116 into different portions, a switch control can be used to charge these different portions alternately in order to allow a lower voltage produced by the regulator 102 to charge the battery which is at a higher voltage potential. It is well known in the art that pulse charging of batteries is highly desirable since it provides for a reduced heating of the cells. This charging scheme also contributes to extended battery life, highly desirable in battery operated devices. It is well understood that the micro-computer 120 can be used to control the mode selector 104 and the switching of switch control circuitry 106. In this embodiment, a separate circuit is used to provide timing for the switches 112 and 114 in order to eliminate microcomputer dependencies. The inclusion of the charging elements in the communication device 100, eliminates the need to have a separate charging device that must be carried at all times. With the use of a single regulator to provide operating and charging currents, the need for dual regulation and dual heat sinking which consumes significant areas is eliminated. The switching control circuit 106 and the mode select 104 are preferably miniature relays which occupy an insignificant space as compared to that required by a separate heat sink. A variety of circuit topologies may be used to recognize the operation of the switch control circuit 106 and the mode select 104.

What is claimed is:

1. An electronic device, comprising:
   a first circuit operating on a first voltage;
   a second circuit operating on a second voltage, wherein the first voltage is higher than the second voltage;
   a battery for producing the first voltage;
   a regulator operating selectively on the first voltage and producing the second voltage; and
   means for charging the battery using the second voltage produced by the regulator.

2. The electronic device of claim 1, wherein the first circuit includes a power amplifier.

3. The electronic device of claim 1, wherein the second circuit includes a radio communication device.

4. The electronic device of claim 3, wherein the radio communication device includes a transmitter.

5. The electronic device of claim 1, wherein the battery includes a plurality of cells connected to each other in such a way to form a plurality of battery sections.

6. The electronic device of claim 5, wherein the plurality of sections include a first section and a second section.

7. The electronic device of claim 6, wherein the means for charging the battery includes a switching means for charging the battery by alternately coupling the regulator to the first and the second sections of the battery.

8. The electronic device of claim 1, wherein the regulator includes a switching regulator.

9. A communication device, comprising:
   a battery for generating a battery voltage, the battery having a plurality of cells connected to each other in such a way to form a plurality battery portions;
   regulator means for producing a regulated voltage;
   a transmitter operating on the regulated voltage;
   a power amplifier coupled to the transmitter and operating on the battery voltage; and
   switching means coupled to the regulator means for alternately switching the regulated voltage to the plurality of battery portions in order to charge the battery.

10. The communication device of claim 9, further including an audio amplifier.

11. The electronic device of claim 9, wherein the plurality of portions includes a first portion and a second portion.

12. The electronic device of claim 9, wherein the regulator means comprises a switching regulator.

* * * * *